A. TURNER & T. ROBINSON.
FELT HAT BODY PLANKING MACHINE.
APPLICATION FILED DEC. 16, 1911.

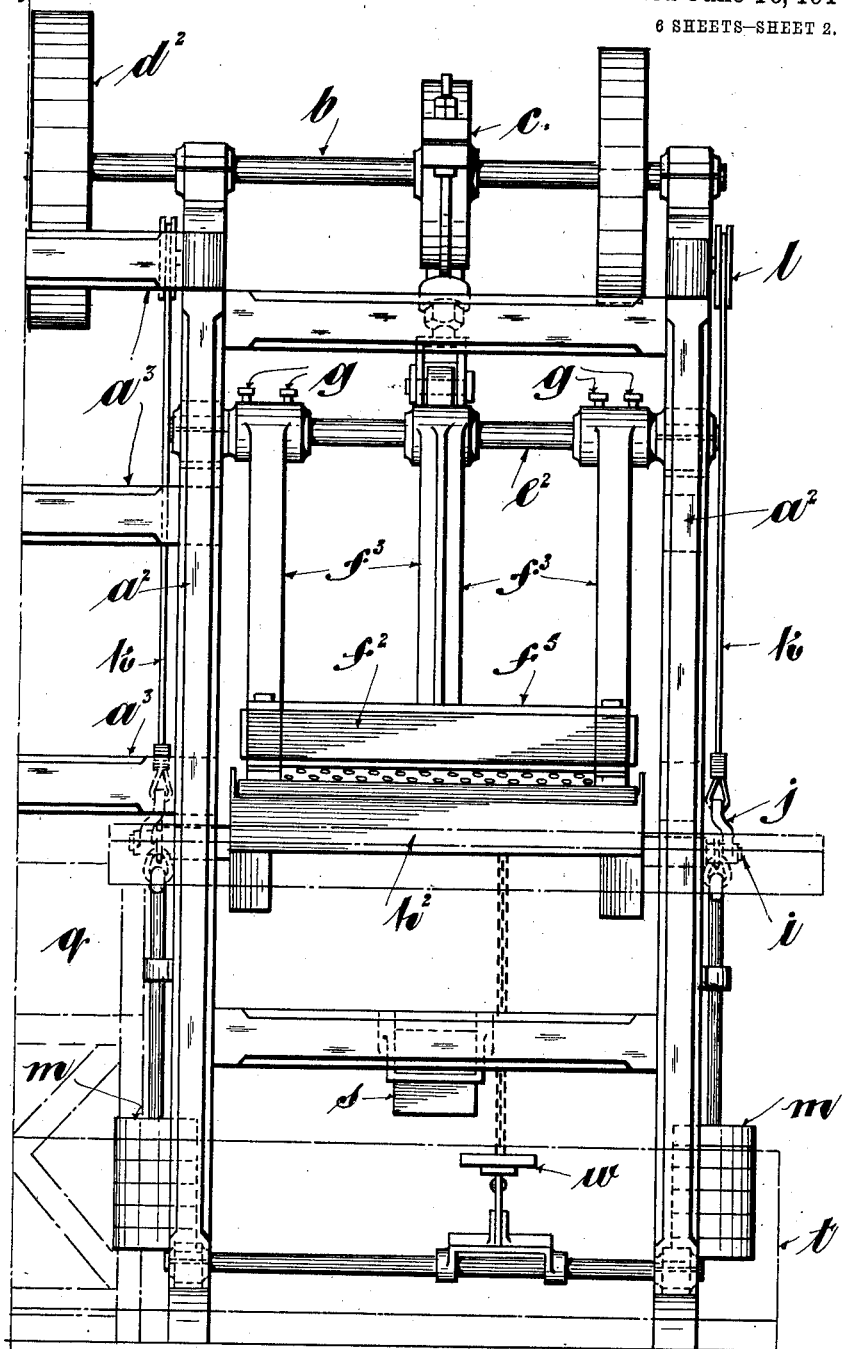

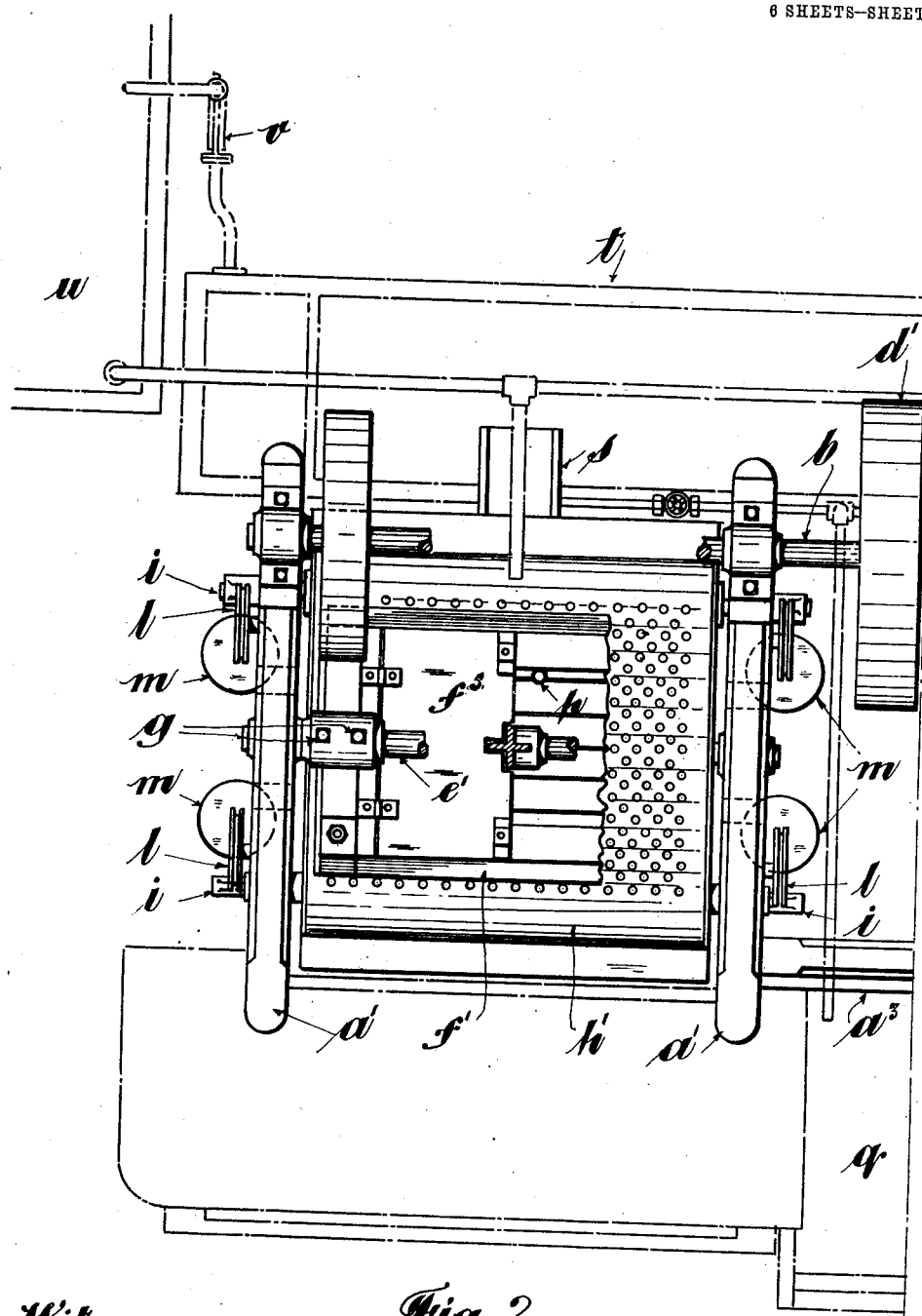

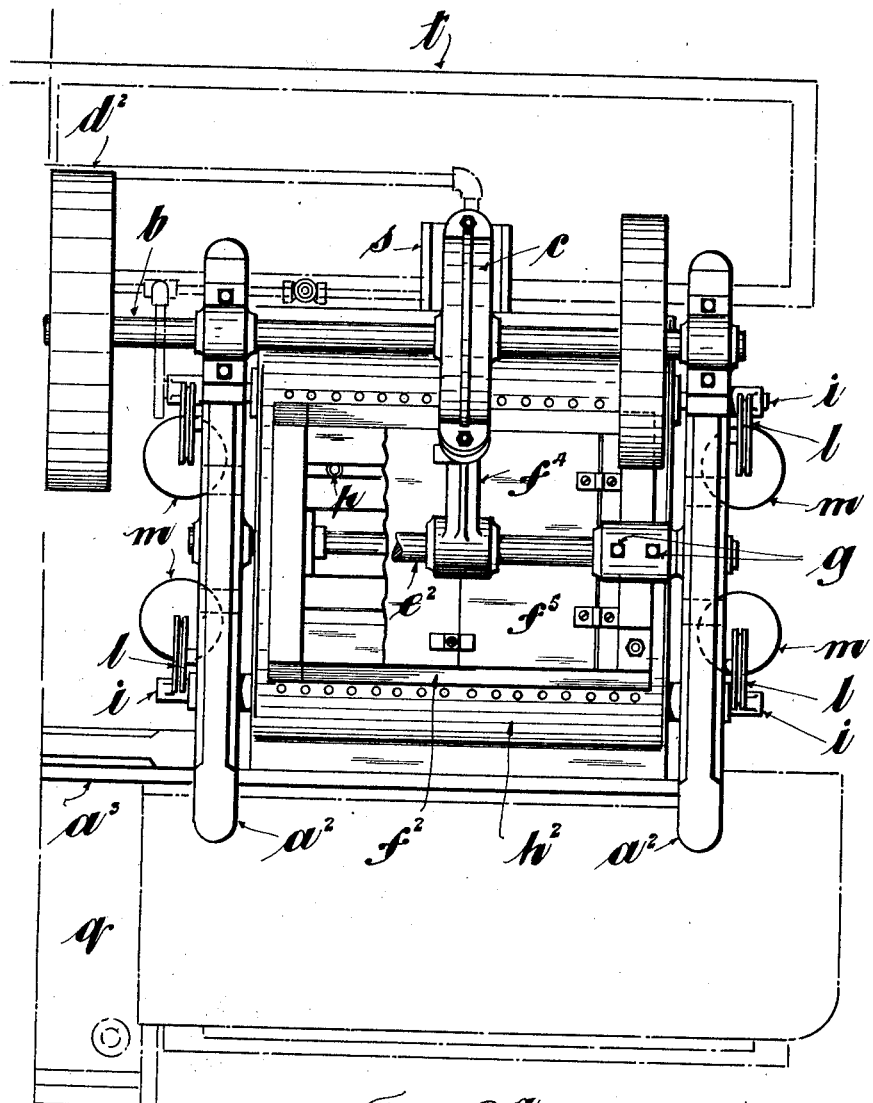
Fig. 2ᵃ.

1,100,459.

Patented June 16, 1914.
6 SHEETS—SHEET 6.

UNITED STATES PATENT OFFICE.

ALBERT TURNER AND THOMAS ROBINSON, OF DENTON, MANCHESTER, ENGLAND.

FELT-HAT-BODY-PLANKING MACHINE.

1,100,459.

Specification of Letters Patent. Patented June 16, 1914.

Application filed December 16, 1911. Serial No. 666,243.

*To all whom it may concern:*

Be it known that we, ALBERT TURNER and THOMAS ROBINSON, both subjects of the King of Great Britain and Ireland, and residents of Denton, Manchester, England, have invented certain new and useful Improvements in Felt - Hat - Body - Planking Machines, of which the following is a specification.

This invention refers to improvements in felt hat body planking machines, and in particular to those of the kind in which a segmental planking member is arranged to move to and fro in the arc of a circle over a relatively fixed segmental planking member, the hat bodies to be planked being placed between them, and the frictional contact, pressure and heat, serving to effect the planking operation.

One of the features of this invention is that a more flexible or "kindly" action of the planking members is obtained and that such action can be readily modified to suit the quality or kind of hat bodies to be treated, or the stage or degree of treatment, that is to say, for one quality of hat, stage or degree of treatment a soft yielding action is obtainable, while for another quality, stage or degree a hardier or less yielding action may be obtained.

Another feature of the invention consists in making the machine to work from the front side only, instead of front and back, and in thus insuring of the hot water, etc., used in planking, collecting in the middle of the trough formed by the lower planking member, and the hat bodies always receiving the maximum amount of water.

A further feature of the invention consists in making two or more machines (preferably in multiples of two) in one, and using one dipping trough for two sets of planking members and balancing the eccentric (or crank) of one set of members by the eccentric (or crank) of the other set.

Figure 1:
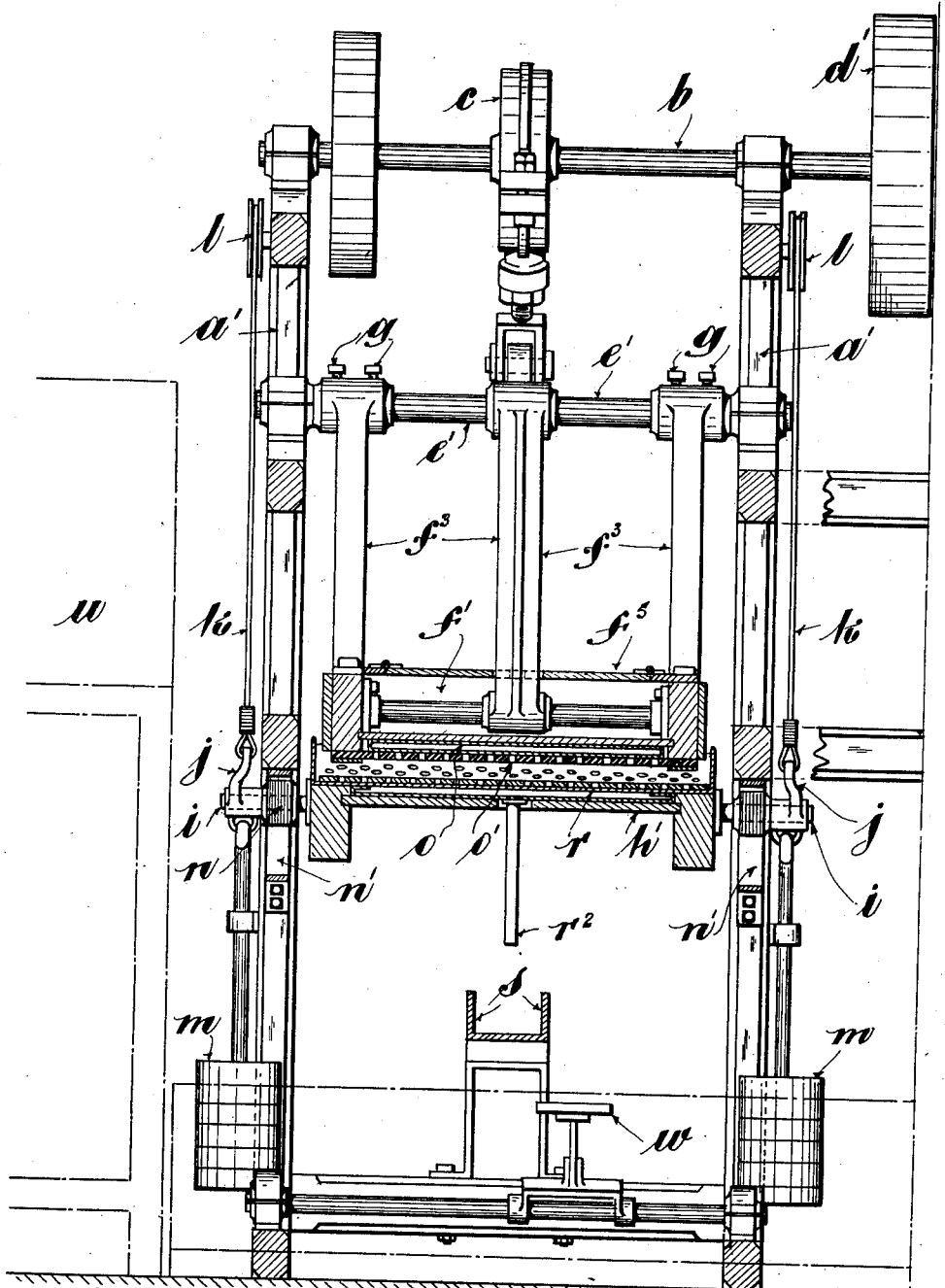
Figure 3:
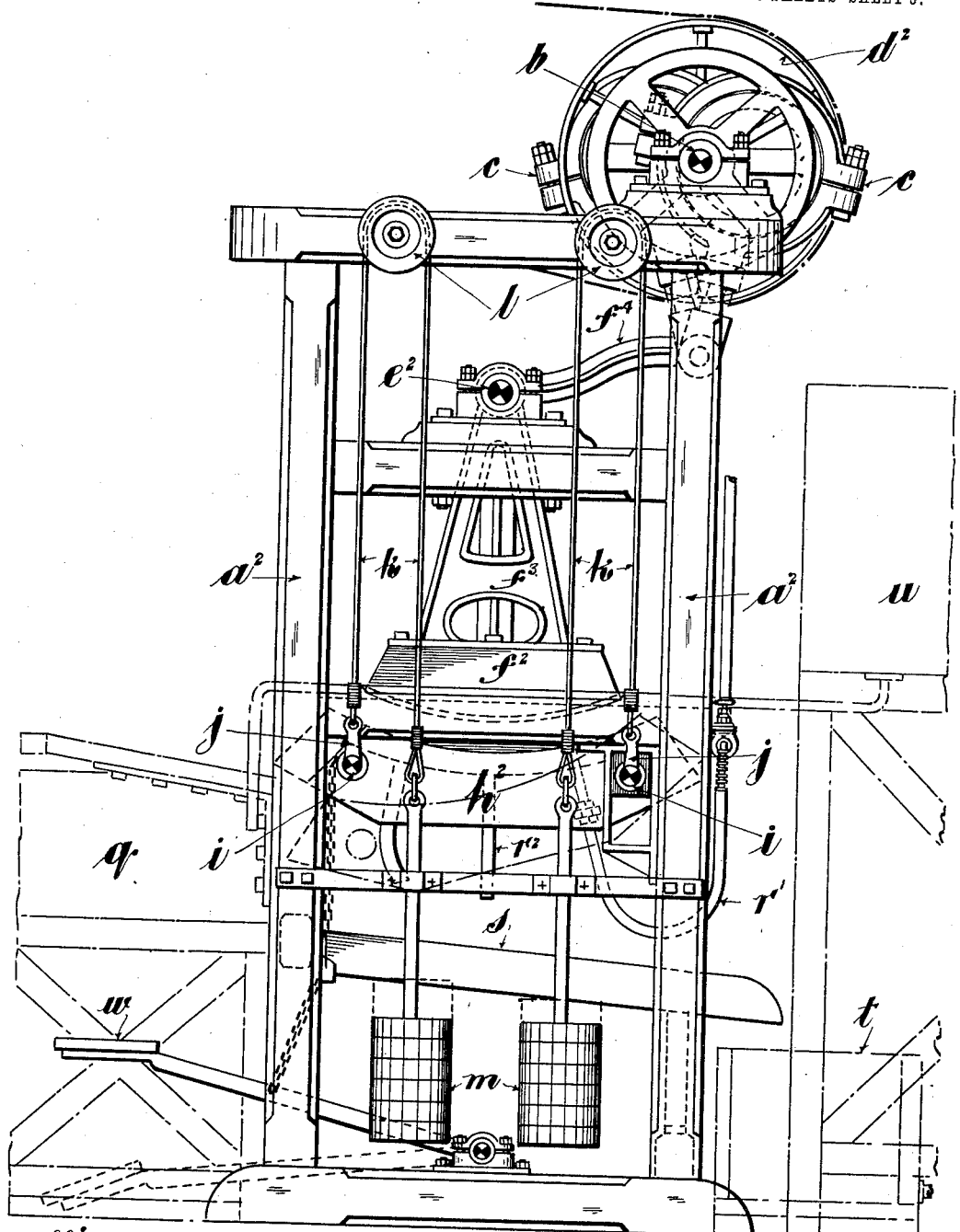
Figure 4:
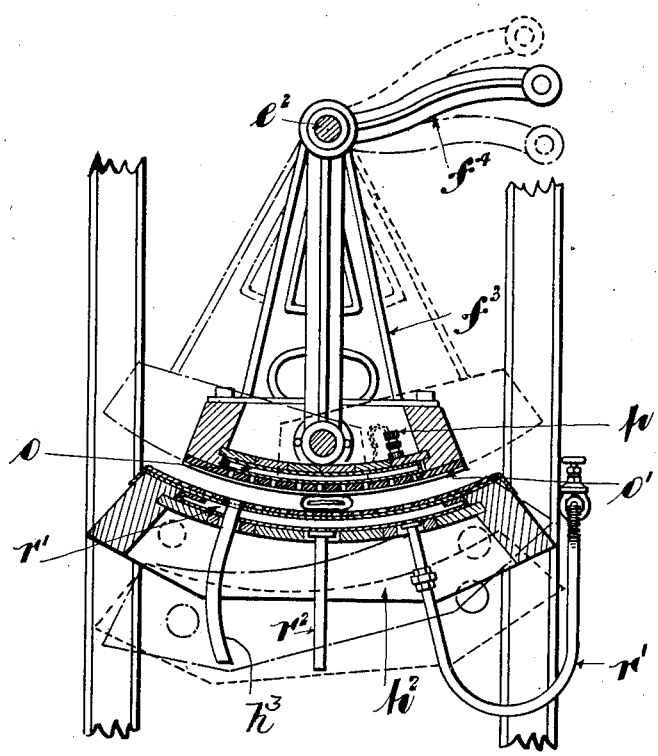

Upon the accompanying drawings, Figure 1 and Fig. 1ª illustrate a part sectional and part exterior front elevation. Fig. 2 and Fig. 2ª a plan with parts broken away, and Fig. 3 an end elevation of a machine embodying the invention. Fig. 4 illustrates a detached transverse vertical section of one pair of planking members.

As shown, the improved machine comprises a wood framing $a'$ and a wood framing $a^2$ joined by cross bars $a^3$ to make the frame for the complete machine. Supported in bearings upon the top of the framing is the shaft $b$ and upon such shaft are eccentrics $c$, $c$ one eccentric being set to balance the other. Upon the same shaft are fast and loose pulleys $d'$, $d^2$ by which motion is transmitted to the shaft. Mounted upon shafts $e'$, $e^2$ in the upper parts of the framings $a'$, $a^2$ are the swing planking members $f'$, $f^2$ these latter being of segmental formation and provided with radius arms $f^3$ and these latter being secured fast to the shaft $e'$, $e^2$ by set bolts $g$, $g$ or other suitable means, in order that they shall move with the shafts. Connected with the central arm $f^3$, of each planking member $f'$, $f^2$, is an arm $f^4$. To this arm is connected one of the eccentrics $c$. Below the said planking members $f'$, $f^2$ are yieldingly supported the relatively stationary segmental planking members $h'$, $h^2$, the means of support consisting of studs $i$ secured to each end and corner of the planking member, links $j$, ropes $k$ running over pulleys $l$ and weights $m$.

The studs $i$ at the rear of the machine will preferably pass through blocks $n$ designed to slide in guide brackets $n'$. The stud $i$ at the front of the machine may also pass through blocks designed to move in curved brackets, but usually these brackets will be dispensed with.

The construction of each planking member $f'$, $f^2$ according to this invention is as follows: The frame part is made of two curved pieces of wood joined at each end and center by straight pieces of wood. Forming a floor for the frame part is a series of lags. Below these lags is an india-rubber bag $o$, see Figs. 1 and 4, which is held in position by a sheet or diaphragm of thick india-rubber $o'$, this latter being secured along its edges to the frame part by suitable brass clamping plates. Upon its top side the air bag is provided with an air inlet nozzle and valve $p$ which projects through an opening in one of the lags and is thus accessible for inflating purposes from the top side of the planking member. A removable or hinged cover $f^5$ serves to close in the upper part of the frame. For enabling it to more readily engage the hat bodies the rubber diaphragm $o'$ may have a number of small holes, see Fig. 1, or its lower face may be corrugated. And to allow for ready repair and economy the india-rubber may be applied in strips arranged parallel and those lying central to the planking member being thicker than those near to the edge.

The lower planking members $h'$, $h^2$ each comprise a like wood frame, and also when very little heat is required an air bag and rubber diaphragm, but usually a sheet of perforated sheet lead laid upon the lags will serve.

As shown in Fig. 4, the upper face of the lower planking member is concentric to the shaft $e^2$, about which the upper planking member oscillates, therefore, the hat bodies when introduced tend to lie in the center of the lower member, and the water also tends to accumulate at such point and thus give the best results. The hot water is obtained from a tank $q$ common to the two sets of planking members. Each framing $a'$, $a^2$ is provided with boards or tables for supporting the hats while being rolled up preparatory to being placed in the machine.

The lower planking members are heated by steam, the space below the lags being closed by a piece of sheet metal to form a steam chamber $r$. To such chamber is connected a pipe $r'$ for conveying steam to the said chamber, and in the floor of the said chamber is a pipe $r^2$ for the escape of the water of condensation. In the center of the working face of the length of each planking member $h'$, $h^2$ is a drain pipe $h^3$ (see Fig. 4) and such pipe extends below the planking member and terminates over a trough $s$, see Fig. 3. The top end of the drain pipe $h^3$ lies at a level where it allows of a pool of water to collect in the lower planking member and acts as an overflow pipe when the water gets above the desired quantity. This trough leads to a tank $t$ common to both sets of planking members. To prevent waste of acid a large overhead tank $u$, see Fig. 3, may be used and also a pump $v$ by which the water from the trough $t$ may be delivered into the overhead tank from which it may subsequently run back by gravity into the tank $q$ at the front of the machine in a hot boiling state.

Below each lower planking member $h'$, $h^2$ is a foot-treadle $w$ by which and a chain connected to the under and front side of the lower member $h'$, or $h^2$ the planking members may be readily separated to admit of the introduction or removal of the hat bodies to be planked, the position of the lower member, when drawn down by the treadle, being shown by the dotted lines in Fig. 4. The broken lines in Fig. 4 show the position of the upper planking member when the hat bodies are being planked. The weights $m$ will normally serve to counter-balance the weight of the planking members $h'$, $h^2$ and to hold such members with a yielding pressure. It should now be seen that by combining two sets of planking members in one machine, and feeding them from the front only, a more satisfactory arrangement is provided than heretofore. And by the use of a planking member fitted with an elastic bag a very much better planking action can be obtained or the planking action can be varied with great nicety to suit the hats to be treated. Further, with the working faces of both members covered with rubber there is very little risk of damaging the hats.

By reason of the delicately yielding character of the upper planking member, napped or "ruffed" hats may be treated equally well with other kinds and the machine can also be readily adapted for use in "settling."

While preferring the duplex construction of machine, it will be understood that the improved planking member with elastic bag can be used in a single machine. Contrariwise, the machine may comprise more than two sets of planking members.

What we claim is:—

1. In a felt hat body planking machine, upper and lower segmental planking members, one the upper, capable of moving in the arc of a circle and the other the lower, capable of moving vertically, means for supporting the lower member at each corner and holding it yieldingly against the upper member, an india-rubber bag applied to one of said members and a device connected to said bag whereby the latter may be inflated and the other segmental member made hollow and adapted to be heated by steam, means for conveying steam to the interior of the hollow member, and means for removing water of condensation therefrom, as set forth.

2. In a felt hat body planking machine, a segmental member comprising two curved pieces of wood joined at each end and center by straight pieces of wood, and also comprising lags lying within the space surrounded by the said curved and straight pieces of wood, an india-rubber bag lying against the lags, and a sheet of india-rubber for inclosing the bag and forming the working face of the planking member, and a device connected to said bag whereby the latter may be inflated, as set forth.

In witness whereof we have hereunto set our hands in the presence of two witnesses.

ALBERT TURNER.
THOMAS ROBINSON.

Witnesses:
F. C. PENNINGTON,
FRED. J. MEREDITH.

---

Copies of this patent may be obtained for five cents each, by addressing the "Commissioner of Patents, Washington, D. C."